US007418506B1

(12) United States Patent
Achtermann et al.

(10) Patent No.: US 7,418,506 B1
(45) Date of Patent: Aug. 26, 2008

(54) APPARATUS FOR CONNECTION MANAGEMENT AND THE METHOD THEREFOR

(75) Inventors: Jeffrey Mark Achtermann, Austin, TX (US); Arabinda Bose, Cedar Park, TX (US); Alberto Giammaria, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,436

(22) Filed: Nov. 12, 1999

(51) Int. Cl.
 *G06F 15/16* (2006.01)
 *G06F 15/177* (2006.01)
 *G06F 15/173* (2006.01)
 *G06F 9/46* (2006.01)
 *G06F 11/00* (2006.01)

(52) U.S. Cl. .................. 709/227; 709/222; 709/223; 718/102; 718/103; 714/4

(58) Field of Classification Search ............. 709/227, 709/224, 226, 228, 223, 229, 248, 102, 103, 709/222; 370/270; 718/103, 102; 714/4, 714/48
See application file for complete search history.

(56) References Cited

U.S. PATENT DOCUMENTS

| 4,642,758 | A | * | 2/1987 | Teng ........................... 707/10 |
| 5,414,845 | A | * | 5/1995 | Behm et al. ................. 709/104 |
| 5,442,730 | A | * | 8/1995 | Bigus ........................... 706/19 |
| 5,630,128 | A | * | 5/1997 | Farrell et al. ................ 709/103 |
| 5,644,768 | A | * | 7/1997 | Periwal et al. .............. 718/102 |
| 5,737,498 | A | * | 4/1998 | Murray ........................ 700/246 |
| 5,742,829 | A | * | 4/1998 | Davis et al. ................. 717/178 |
| 5,812,469 | A |   | 9/1998 | Nadeau-Dostie et al. .... 365/201 |
| 5,826,081 | A | * | 10/1998 | Zolnowsky ................. 709/103 |
| 5,887,141 | A | * | 3/1999 | Trugman ..................... 709/203 |
| 5,920,546 | A | * | 7/1999 | Hebert et al. ............... 370/260 |
| 5,925,096 | A | * | 7/1999 | Hlasnik et al. .............. 709/103 |
| 6,014,760 | A | * | 1/2000 | Silva et al. ...................... 705/8 |
| 6,021,425 | A | * | 2/2000 | Waldron et al. ............. 709/103 |

(Continued)

OTHER PUBLICATIONS

Ross et al, "Optimal Load Balnacing and Scheduling in a Distributed Computer System", 1991, ACM.*

(Continued)

*Primary Examiner*—Ario Etienne
*Assistant Examiner*—Gregory G Todd
(74) *Attorney, Agent, or Firm*—Duke W. Yee; Justin M. Dillon; Wayne P. Bailey

(57) ABSTRACT

An apparatus and method for scheduling data distributions to or results information from, or collectively, "jobs" to a plurality of data processing systems via a network. A connection to a target system is created. For each distribution, a session, which is an independent thread, is allocated from one of a plurality of pool of sessions and launched to effect execution of the job. Each pool corresponds to a predetermined priority level, and the session is allocated from the pool having the same priority level as the priority level of the job being scheduled. A connection supports a multiplicity of independent threads. In the event of an error, the session is released, and the scheduling of the aborted job is retried after a predetermined retry interval expires. After expiry of the retry interval, a callback method is invoked when the target system on which the scheduled job is executed becomes accessible.

9 Claims, 7 Drawing Sheets

U.S. PATENT DOCUMENTS

| | | | | |
|---|---|---|---|---|
| 6,032,193 | A * | 2/2000 | Sullivan | 709/239 |
| 6,058,424 | A * | 5/2000 | Dixon et al. | 709/226 |
| 6,105,067 | A * | 8/2000 | Batra | 709/102 |
| 6,134,313 | A * | 10/2000 | Dorfman et al. | 379/201.01 |
| 6,141,677 | A * | 10/2000 | Hanif et al. | 709/100 |
| 6,167,537 | A * | 12/2000 | Silva et al. | 714/46 |
| 6,182,110 | B1 * | 1/2001 | Barroux | 709/201 |
| 6,182,120 | B1 * | 1/2001 | Beaulieu et al. | 709/207 |
| 6,208,661 | B1 * | 3/2001 | Marshall | 370/230 |
| 6,249,836 | B1 * | 6/2001 | Downs et al. | 710/268 |
| 6,260,077 | B1 * | 7/2001 | Rangarajan et al. | 719/328 |
| 6,289,371 | B1 * | 9/2001 | Kumpf et al. | 709/203 |
| 6,388,687 | B1 * | 5/2002 | Brackett et al. | 345/748 |
| 6,411,982 | B2 * | 6/2002 | Williams | 709/102 |
| 6,477,569 | B1 * | 11/2002 | Sayan et al. | 709/223 |
| 6,487,577 | B1 * | 11/2002 | Sundararajan | 709/102 |
| 6,490,273 | B1 * | 12/2002 | DeNap et al. | 370/352 |
| 6,496,851 | B1 * | 12/2002 | Morris et al. | 709/204 |
| 6,502,121 | B1 * | 12/2002 | Threlkeld | 709/100 |
| 6,560,626 | B1 * | 5/2003 | Hogle et al. | 718/102 |
| 6,567,840 | B1 * | 5/2003 | Binns et al. | 718/103 |
| 6,671,713 | B2 * | 12/2003 | Northrup | 709/203 |
| 6,779,182 | B1 * | 8/2004 | Zolnowsky | 718/103 |
| 6,782,410 | B1 * | 8/2004 | Bhagat et al. | 709/201 |
| 6,801,943 | B1 * | 10/2004 | Pavan et al. | 709/226 |
| 6,829,764 | B1 * | 12/2004 | Cohen et al. | 718/103 |
| 6,915,509 | B1 * | 7/2005 | Chkodrov et al. | 717/124 |
| 7,020,878 | B1 * | 3/2006 | Rhee et al. | 718/102 |

OTHER PUBLICATIONS

Coffman et al, "Scheduling File Transfers in a Distributed Network", 1983, ACM.*

* cited by examiner

APPARATUS FOR CONNECTION MANAGEMENT AND THE METHOD THEREFOR

CROSS-REFERENCE TO RELATED APPLICATIONS

Related subject matter may be found in the following commonly assigned, co-pending U.S. patent applications, both of which are hereby incorporated by reference herein:

Ser. No. 09/460,855, entitled "APPARATUS FOR DATA DEPOTING AND METHOD THEREFOR"

Ser. No. 09/460,853, entitled "APPARATUS FOR RELIABLY RESTARTING INTERRUPTED DATA TRANSFER AT LAST SUCCESSFUL TRANSFER POINT AND METHOD THEREFOR"

Ser. No. 09/438,437, entitled "AN APPARATUS AND METHOD FOR DISTRIBUTING AND COLLECTING BULK DATA BETWEEN A LARGE NUMBER OF MACHINES" and filed concurrently herewith;

Ser. No. 09/458,268, entitled "COMPUTER NETWORK CONTROL SYSTEMS AND METHODS" and filed concurrently herewith;

Ser. No. 09/460,852, entitled "METHODS OF DISTRIBUTING DATA IN A COMPUTER NETWORK AND SYSTEMS USING THE SAME"

Ser. No. 09/458,269, entitled "SYSTEMS AND METHODS FOR REAL TIME PROGRESS MONITORING IN A COMPUTER NETWORK";

Ser. No. 09/460,851, entitled "APPARATUS FOR AUTOMATICALLY GENERATING RESTORE PROCESS DURING SOFTWARE DEPLOYMENT AND METHOD THEREFOR"; and Ser. No. 09/460,854, entitled "AN APPARATUS FOR JOURNALING DURING SOFTWARE DEPLOYMENT AND METHOD THEREFOR".

TECHNICAL FIELD

The present invention relates generally to data processing systems, and in particular, to bulk data distributions within networked data processing systems.

BACKGROUND

Present day data processing systems are often configured in large multi-user networks. Management of such networks may typically include the need to transfer bulk data to an endpoint system from a source system (or, simply, "a source") and the collection of information, for example, error reports from a multiplicity of endpoints systems (or, simply, "endpoints").

Such large data transfers may occur within a network, for example, to distribute software updates. The system administrator may need to allocate a specific period of time for the data transfer to more efficiently utilize network resources. This may typically occur when the communication load on the system is lowest, usually at night when most endpoint users are not working at their stations. The system administrator may load the bulk data and the corresponding transfer instructions onto the network system's source, or server, in preparation for the transfer. At the predetermined time set by the administrator, the server will push the data while ensuring that the bulk data is successfully transferred to each of the desired endpoint locations. However, during the transfer a portion of the system server is dedicated to the data transfer and thus unavailable for other networking tasks. Moreover, as the number of endpoints which must be simultaneously serviced by the bulk data distribution increases, network bandwidth demands are concomitantly increased. This complicates scalability of the bulk distribution systems.

Therefore, a need exists in the art for a bulk distribution mechanism that can transfer large amounts of data between network connected subsystems (or nodes) while maintaining scalability. Additionally, there is a need in such distribution mechanisms for methods and apparatus to distribute bulk data to a multiplicity of endpoints and to collect bulk data, including large log files, from the endpoints.

SUMMARY OF THE INVENTION

The aforementioned needs are addressed by the present invention. Accordingly, there is provided, in a first form, a connection scheduling method. The method determines if a job is available for scheduling. It is also determined if a session for effecting an execution the job is available. The session is included in a pool of sessions, in which the pool of sessions has a preselected one of a set of priority levels. The preselected priority level corresponds to a priority level of the job being scheduled for execution. If available, the session is launched to effect the execution of the job.

There is also provided, in a second form, a data processing system for connection scheduling. The system contains circuitry operable for determining if a job is available for scheduling. Also included is circuitry operable for determining, in response to the circuitry operable for determining if a job is available, if a session is available. The session is included in a pool of sessions, the pool of sessions having a preselected one of a set of priority levels corresponding to a priority level of the job. The session effects an execution of the job. The system also has circuitry operable for launching the session to effect the execution of the job, if the session is available.

Additionally, there is provided, in a third form, a computer program product embodied in a machine readable storage medium. The program product for job scheduling includes instructions for determining if a job is available for scheduling. The program product also contains instructions for determining, in response to the instructions for determining if the job is available, if a session is available, wherein the session is included in a pool of sessions, the pool of sessions having a preselected one of a set of priority levels corresponding to a priority level of the job. The session effects an execution of the available job. The program product also contains instructions for launching the session to effect the execution of the job, if the session is available.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention is a method and apparatus for managing connections in a system for distributing and collecting data between an originating source system and a plurality of endpoint systems (which may also be referred to as "endpoint nodes" or simply "endpoints"). The method and apparatus provides a mechanism for managing a plurality of sessions, or threads, for sending a distribution to or receiving results information from the corresponding target machine. Sessions are allocated in accordance with a preselected distribution priority. Each distribution priority level has a predetermined number of sessions available to it in a corresponding sessions pool. By scheduling distributions on their priorities, large, low priority distributions will no longer "bottleneck" high priority small distributions.

According to the principles of the present invention, the present invention has an originating source system followed by repeaters. The use of repeaters allows data to be delivered essentially simultaneously to a large number of machines. The present invention can be scaled to handle more destinations by adding repeaters. In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

A more detailed description of the implementation of the present invention will subsequently be provided. Prior to that discussion, an environment in which the present invention may be implemented will be described in greater detail.

Figure 1:
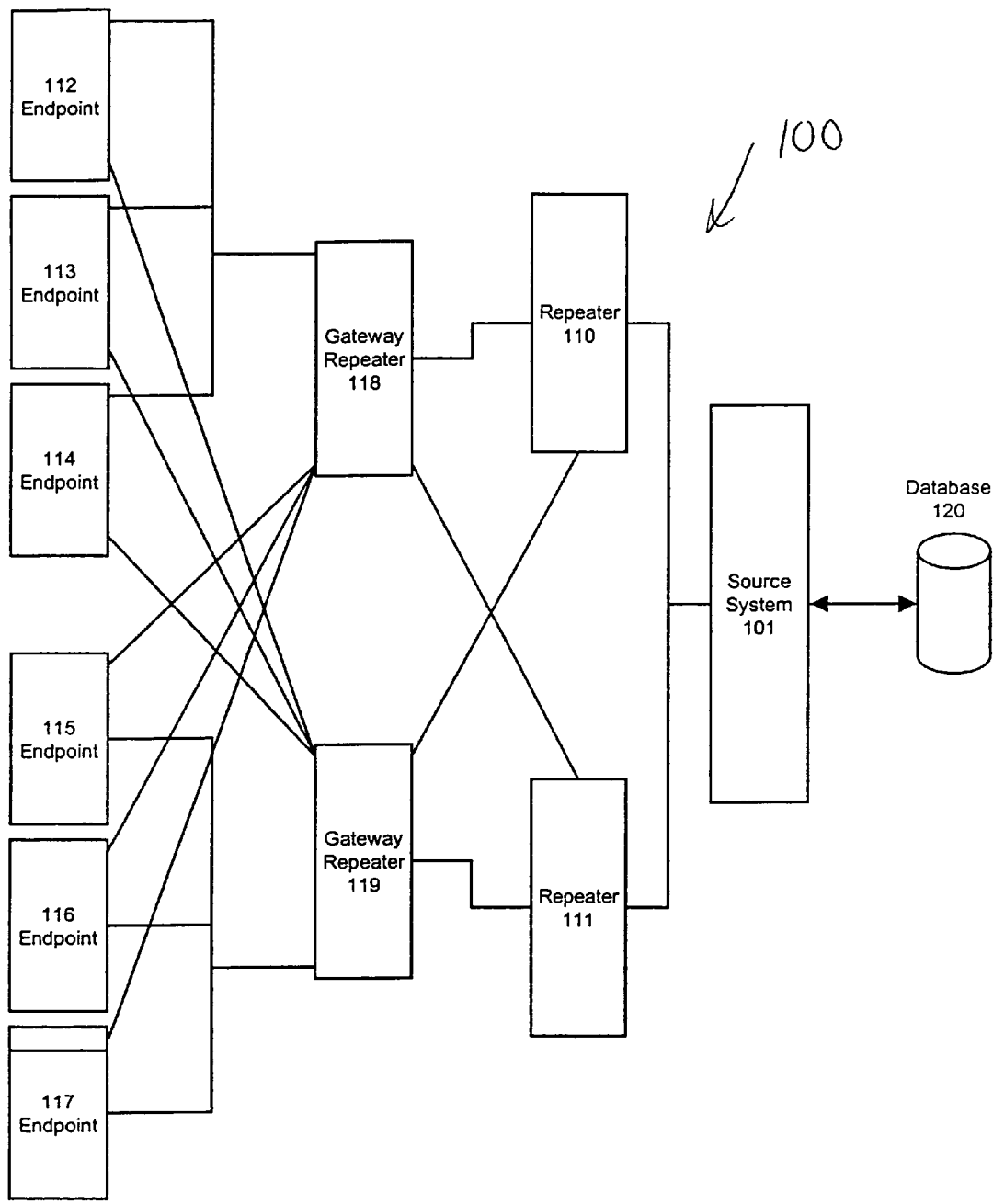
FIG. 1 illustrates, in block diagram form, a data processing network in accordance with an embodiment of the present invention.

FIG. 1 illustrates a communications network 100. The subsequent discussion and description of FIG. 1 are provided to illustrate an exemplary environment used by the present invention.

The network system 100 includes source system 101, one or more fan out/collector nodes, or, repeaters 110, 111, 118, 119, and a plurality of endpoints 112-117. Additionally, certain repeaters, such as 118 and 119, are directly connected to one or more endpoints, in the exemplary embodiment of FIG. 1, endpoints 112-114 or 115-117, respectively, and may be referred to as "gateway" repeaters (or, simply, "gateways").

Source system 101 provides distribution services with respect to resources 112-117. Note that source system 101 and endpoints 112-117 interfaces to repeaters 110 and 111 using the same methodologies as repeaters 110 and 111 interface with, for example, repeaters 118 and 119. Viewed logically, source system 110 and endpoints 112-117 each may include a "repeater." In other words, as an artisan of ordinary skill would recognize, a repeater may be a logical element that may be, but is not necessarily associated with a physical, stand-alone hardware device in network 100. Repeater 110 may be the primary repeater through which resources 112-114 receive their data transfers, and repeater 111, likewise, may primarily service endpoints 115-117. The connection management methodologies described below in conjunction with FIGS. 3A-3D may be performed by repeaters 110, 111, 118 and 119. It would be understood by an artisan of ordinary skill that additional repeaters may be inserted into the network and may be arranged in a multi-level hierarchy according to the demands imposed by the network size. Gateway repeaters 118 and 119 are such repeaters in the exemplary embodiment of FIG. 1.

However, network system 100 provides cross connections in order to provide redundant, parallel communication paths should the primary communication path to the endpoint become unavailable. For example, in FIG. 1, endpoint 114 has a primary pathway to source system 101 through repeaters 118 and 110. (A source system, such as source system 101 may also be referred to as a source node.) Should repeater 110 become unavailable, source system 101 can transfer bulk data to endpoint 114 via an alternative pathway through repeaters 118 and 111. Additionally, should repeater 118 become unavailable, endpoint 114 may receive data via repeaters 111 and 119. Source system 101 maintains database 120 for storing information used in managing a data distribution.

Figure 2:
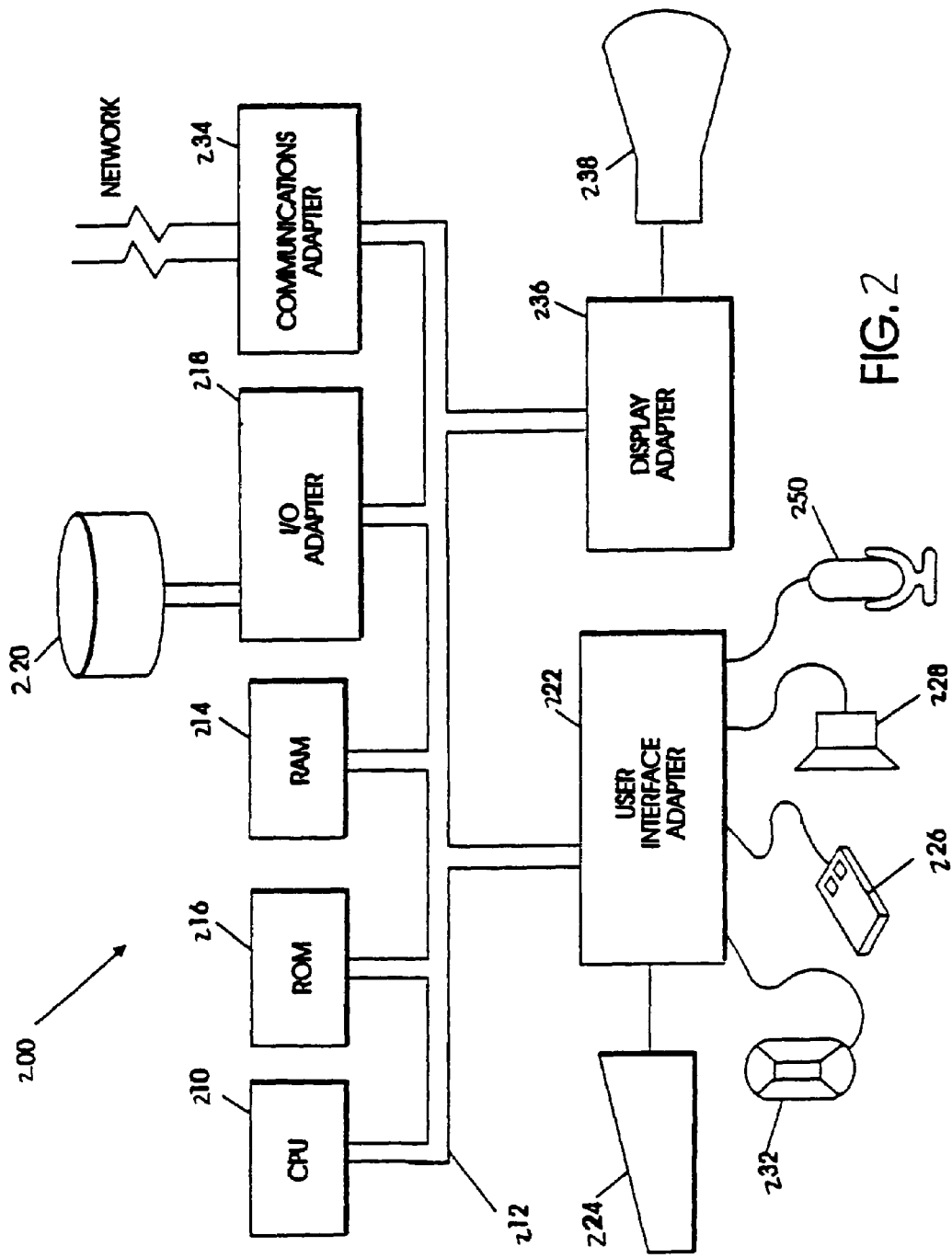
FIG. 2 illustrates, in block diagram form, a data processing system implemented in accordance with an embodiment of the present invention.

Referring next to FIG. 2, an example is shown of a data processing system 200 which may be used to implement a source system such as system 101, repeaters, such as repeaters 110, 111, 118, or 119 or endpoints, such as endpoints 112-117, executing the methodology of the present invention. The system has a central processing unit (CPU) 210, which is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Disk storage device 220 may be used to hold database 120, FIG. 1. Communications adapter 234 interconnects bus 212 with the network as well as outside networks enabling the data processing system to communicate with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238.

Implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 3A:
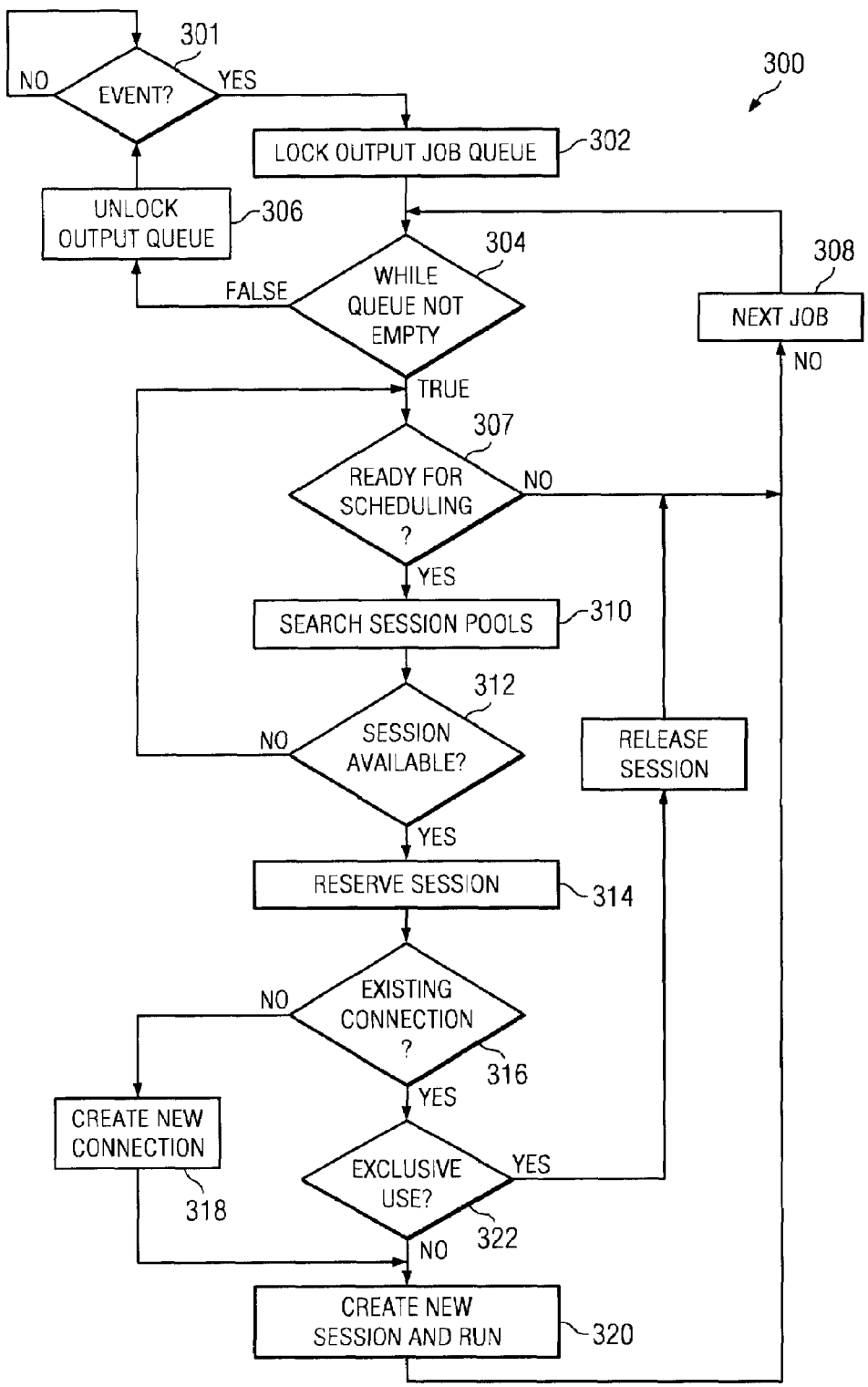
FIG. 3A illustrates, in flowchart form, a connection management thread in accordance with an embodiment of the present invention.

Refer now to FIG. 3A illustrating a connection management thread 300 which may be used in an embodiment of the present invention. Thread 300 may be used by repeaters, such as repeaters 110, 111, 118, and 119 of network 100, FIG. 1. Distributions or results information to be transferred by a repeater are enqueued in an output "job" queue in accordance with the assigned priority of the distribution. (Distributions targeted for ultimate delivery to an endpoint and results information for a report-to system may collectively be referred to simply as "jobs.") The transfer of distributions and results information is discussed in the commonly owned co-pending U.S. patent application entitled "An Apparatus and Method for Distributing and Collecting Bulk Data between a Large Number of Machines," incorporated herein by reference and as described herein, the distribution or results information may be assigned one of three priority levels, low, medium, or high, in an embodiment of the present invention. Distributions are enqueued in order of priority.

In step 302, the job queue is locked, and, while the job queue is not empty, step 304, jobs are scheduled until the queue is exhausted. When the queue is exhausted, in step 306 the output queue is unlocked, whereby new distributions received by the repeater may be enqueued for sending to a target repeater or end point, as appropriate. Scheduling is initiated, when, in step 308, the output job queue is no longer empty. Step 308 constitutes event loop, wherein scheduling is initiated in response to an event such as a "running job completed" event. After a running job completes, a session, as described below, becomes available. A "new job" event, signaling that a new job has arrived at the repeater performing thread 300 will also initiate scheduling.

Returning to step 304, while the queue is not empty, thread 300 proceeds through the queue to schedule distributions for sending to a target repeater or endpoint as appropriate. In step 307 it is determined if a current job is ready for scheduling. If not, in step 308 thread 300 proceeds to the next job. A job may be determined to be ready for scheduling by determining the job state. If the job state has a first predetermined value, which in an embodiment of the present invention may be referred to as "WAITING", then the job is ready for dispatch. The setting of the job state for a particular job will be described below in conjunction with steps 382-384, and 386, FIG. 3C.

If, in step 307, the current job is ready for scheduling, in step 310 the session pools are searched. As indicated hereinabove, distributions may have one of three priorities, high, medium, or low. Each repeater has a pool of sessions, or threads, which are run to transfer data to a target system, either a target repeater or an target endpoint, as appropriate for the particular distribution. As discussed further below, a logical connection to the target system is established for a new job unless the connection is already present because of an ongoing distribution to the same target. A connection can have multiple logical sessions associated with it. Each new session between repeaters or a repeater and an endpoint will establish a network channel or path to transfer data, so between a repeater and an endpoint or another repeater, there can be multiple sessions to execute jobs. That is, there may be parallel data transfer to the same target.

Each distribution to or results information from a target machine "consumes" a session from the pool of sessions available to the distribution or results information. Each repeater has a pool of sessions allocated for each priority level. A session is used by thread 300 to run a job on a preselected target. That is, a session initiates a data transfer through an establish network channel and waits for the target to finish processing data. Jobs are dispatched in order of priority, with higher priority jobs being dispatched preferentially over lower priority jobs. A higher priority job may obtain the session from the pool allocated to its priority, and successively lower priority pools as well.

A higher priority distribution may use sessions from its own pool first. If no sessions are found, then the distribution looks for sessions in the lower priority pools. This may be understood by referring now to FIG. 4 which illustrates in detail a methodology for performing step 310 in accordance with this protocol. In step 410, it is determined if the distribution has a high priority level. If not, then in step 420, it is determined if the distribution has a medium priority level. If not, then the distribution has a low priority, step 430 and, in step 435, it is determined if a low priority to low priority session is available. If a low priority session is available, then in step 450, methodology 500 signals that a session is available. Conversely, if no low priority sessions are available in step 435, in step 440 methodology 400 signals that no session is available.

Returning to step 410, if the job is determined to have a high priority, then in step 415 it is determined if a high priority session is available. If so, then methodology 400 proceeds to step 450. Otherwise, if a high priority session is unavailable, that is, fully used by other jobs, then in step 425 it is determined if a medium priority session is available. Again, if session is available, then step 450 is performed; otherwise, in step 435, it is determined if session allocated to the low priority pool is available. If so, step 435, then step 450 is performed; otherwise, no connections are available and methodology 400 proceeds to step 440.

Similarly, if in step 410, it has been determined that the job is not a high priority distribution, it is determined if the job has a medium priority, step 420. If not, it must again be a low priority job step 430, previously described. Otherwise, in step 420 it is a medium priority job, and in step 425 it is determined if a medium priority session is available. As before, if no medium priority sessions are available, it is determined if a low priority session is available, step 435. In this manner, a with a given priority level can use the number of sessions reserved for its priority level plus any sessions allocated to lower priority levels. If no sessions are available at the assigned priority or lower, the methodology signals no available sessions, step 440, as previously described.

Figure 4:
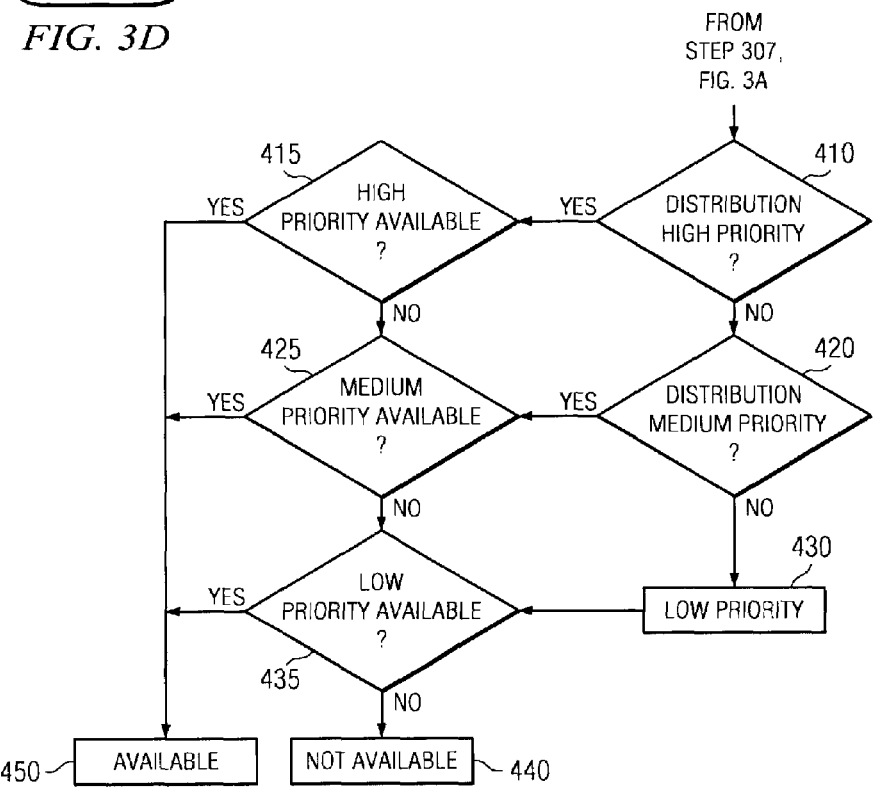
FIG. 4 illustrates, in flowchart form, a methodology implemented to determine priority resource availability in accordance with an embodiment of the present invention.

Returning to FIG. 3A, if, in step 312, it is determined a session is available to the job as reported in step 450, FIG. 4, then the session is reserved in step 314. Otherwise, if it is reported not available, step 440, FIG. 4, step 312 proceeds by the "No" branch to step 307. Because, as previously described, jobs are enqueued in priority order, the unavailability of a session for the current job also means that the succeeding jobs cannot also be scheduled because they have a priority that is the same or lower than the current job. Thread 300 then loops in step 308 for an event indicating that a session has become available, which then triggers thread 300 via the "yes" branch in step 308. Similarly as discussed below, an "UNREACHABLE" state job may become available, whereby the state goes to "WAITING", which will also trigger scheduling.

It is then determined in thread 300 if a connection object, or simply connection, has been established for the target system (which may also be referred to as a target node). Thus, in step 316, a connection list is searched to determine if a connection has been established for the target node. The connection list contains one or more connection objects that are a logical representation of a communication channel, or path, between the repeater running the thread and the target. A connection object maintains the status of the channel. For example if the channel breaks the status of the connection may change from a first value, say "UP", to a second value, say "DOWN." The connection object also includes all of the active sessions associated with the target.

Figure 5:
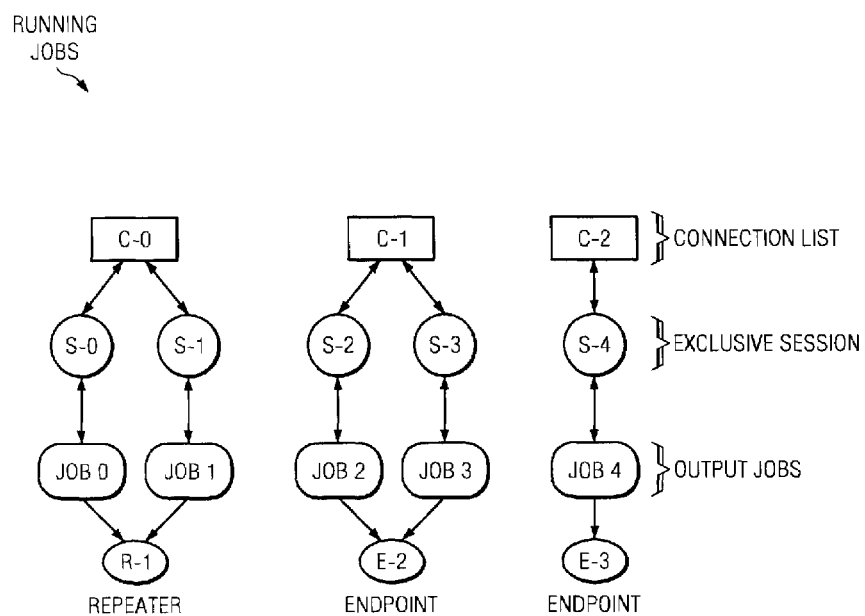
FIG. 5 schematically illustrates a repeater connection list which may be used in an embodiment of the present invention.

If an existing connection does not exist, in step 318 a new connection object is created, and in step 320 a new session is created and run. Recall that a connection can have multiple sessions associated with it, and each session is a thread. For example, schematically shown in FIG. 5, is a repeater connection list with three connections, C-0, C-1 and C-2. Connection C-0 has two active sessions, S-0 and S-1, running Job 0 and Job 1, respectively, for the target, repeater R-1. similarly, connection C-1 has two sessions, S-2 and S-3 running Job 2 and Job 3, respectively on a target endpoint, E-2. An exclusive session, S-4, runs Job 4 on connection C-2, for target endpoint E-3. No other jobs will run on connection C-2 until S-4 ends. If, however, in step 316 a connection exists, it is determined if the connection is being exclusively used by a job, step 322. If the existing connection is exclusive, then the session reserved in step 314 is released, step 324 and thread 300 proceeds to step 308 to schedule the next job.

Figure 3B:
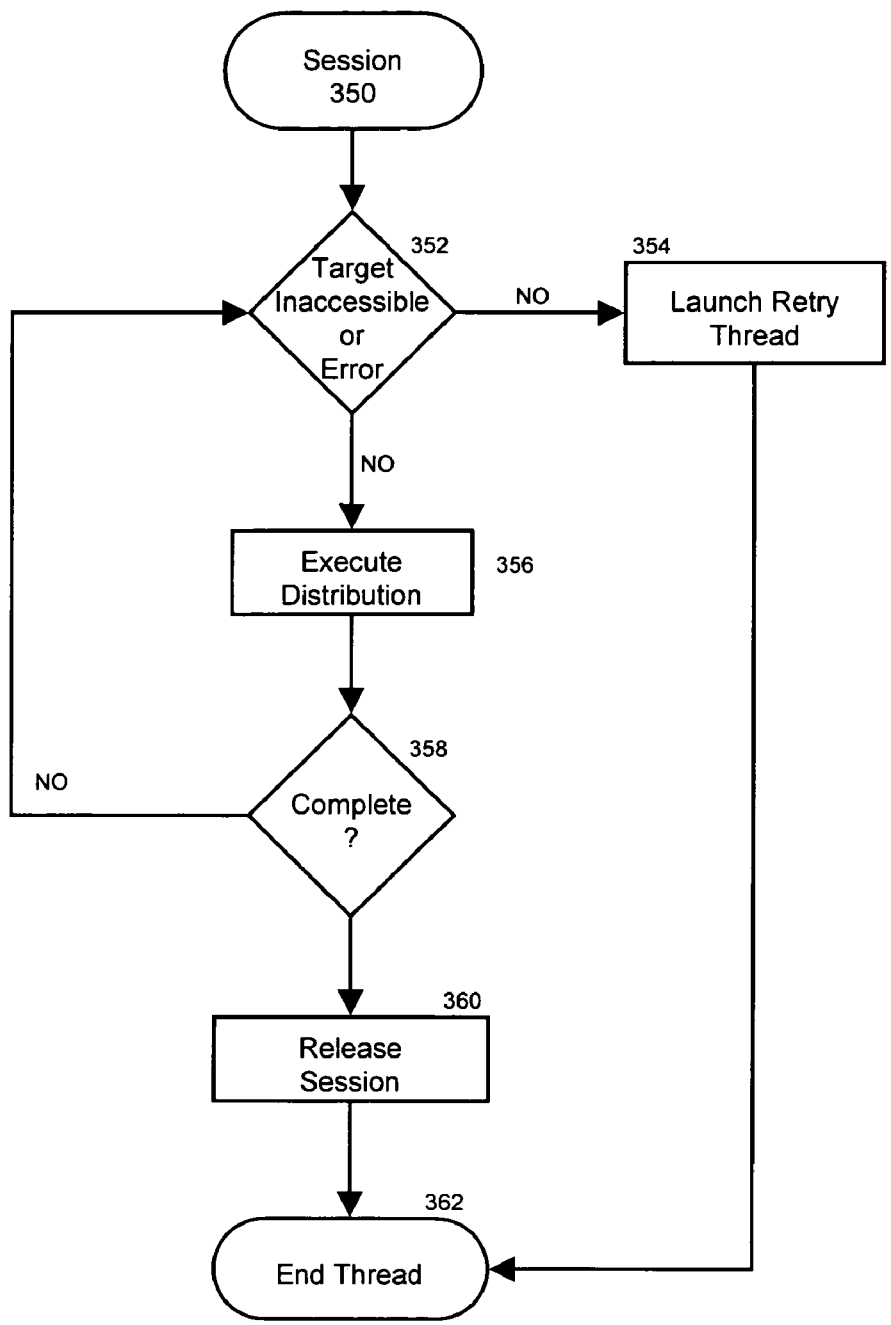
FIG. 3B illustrates, in flowchart form, a session thread in accordance with an embodiment of the present invention.

Returning to FIG. 3A, the creation of a new session, in step 320, launches a session, which, in an embodiment of the present invention, may be session 350, FIG. 3B. In step 352 it is determined if the target system is accessible. The target system may be inaccessible if, for example, the target system is unavailable or due to a network outage. If a target is inaccessible, in step 354 a retry thread is launched. This will be discussed subsequently in conjunction with FIG. 3C below. In step 362, thread 350 ends. If, however, in step 352 the target is accessible, in step 356 the job is executed, where data is transferred to the target and while the target is processing the data, waits and then posts results information to the repeater performing the session. Recall that repeaters transfer results information to one or more report-to nodes, as discussed in detail in the commonly owned co-pending U.S. patent application entitled "An Apparatus and Method for Distributing and Collecting Bulk Data Between a Large Number of Machines," (Ser. No. 09/438,437) incorporated herein by reference. It is determined, in step 358, if the distribution is complete. If not, thread 350 returns to step 352. Otherwise, on completion of the execution of the distribution, again in step 360 the session is released and the thread ends in step 362.

Figure 3C:
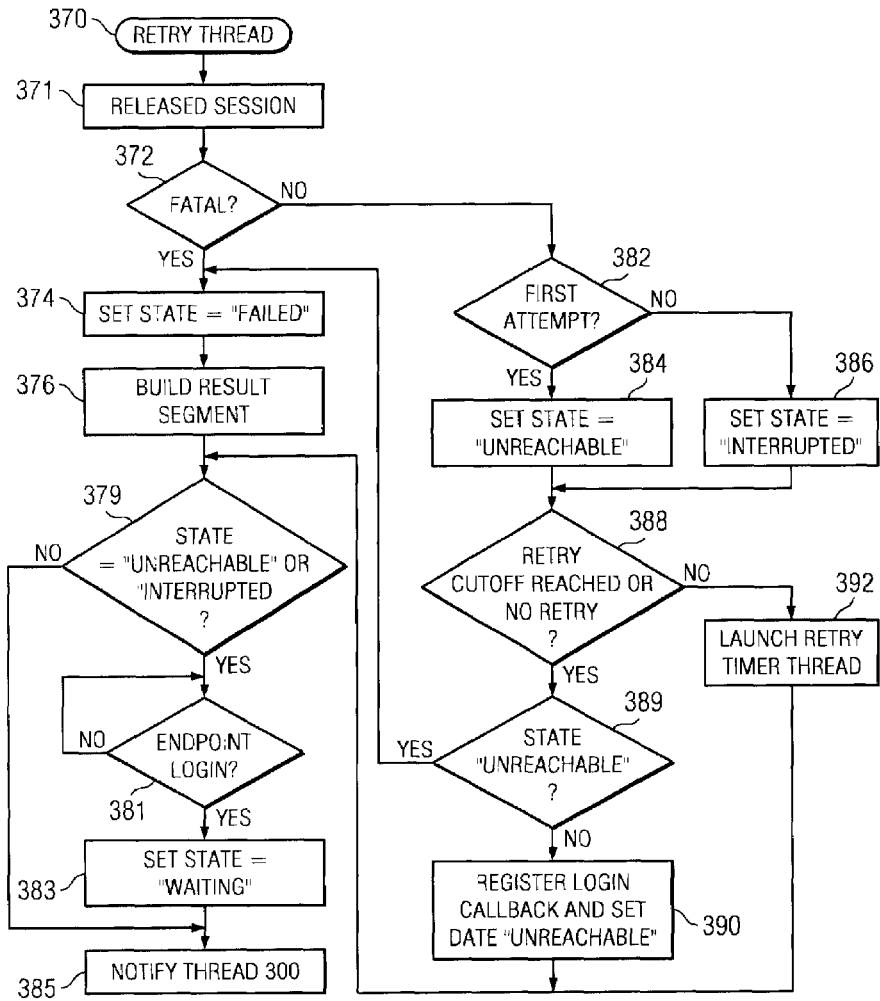
FIG. 3C illustrates, in flowchart form, an error handling thread which may be used with the session thread of FIG. 3B.

Refer now to FIG. 3C describing retry thread 370 which may be launched in response to a distribution failure arising from the unavailability of the target in step 354 above. When an error occurs, the session used to run the job is returned to the corresponding pool. In step 371, thread 370 releases the session, whereby it is returned to the pool having the priority level of the session. In step 372 it is determined if a fatal error has occurred. For example, if the distribution segment, in executing the distribution in step 356 above, is too large to fit into an available disc space, a fatal error will result. If, in step 372, a fatal error has occurred in step 374, the job state is set to "FAILED". In step 376, a results information segment is built which includes the job state. As described in the commonly owned co-pending U.S. patent application entitled "An Apparatus and Method for Distributing and Collecting Bulk Data between a Large Number of Machines" incorporated herein by reference, results information is generated by repeaters and endpoint system and transmitted to one or more report-to systems. In the event of an error, the corresponding results information that is sent to one or more preselected report-to systems in accordance with the methodologies described in the aforesaid co-pending U.S. patent application may be generated in step 376.

Returning to step 372, if the error was non-fatal step 372 proceeds by the "No" branch. If, in step 382, the target system was unavailable on the first attempt to connect to the target system, in step 384 the job state is set to "UNREACHABLE". Otherwise, the connection has broken during the execution of the distribution, and in step 386 the job state is set to "INTERRUPTED".

It is then determined in step 388 if a retry cutoff has been reached. Each connection has a predetermined connection retry time interval that is used to supply a maximum amount of time over which retries for failed jobs will be attempted. Additionally, in step 308 it is determined if an application was specified "no retry." A user, for example, may wish to take corrective action quickly rather than wait for a predetermined number of retries to elapse before receiving notification that the distribution has failed. If the connection retry interval has elapsed, "no retry" is specified, in step 388, the "Yes" branch is followed. In step 389, the job state is tested, and if "UNREACHABLE," then the job fails and the job state is set to "FAILED" in step 374. Otherwise, step 389 proceeds to step 390.

In step 390 the job state is set to "UNREACHABLE" and a login callback method is registered with the corresponding gateway of the target endpoint system. The login callback will be invoked and a login notification thereby provided to the repeater performing management thread 300. Thread 370 proceeds to step 379, discussed below.

If the target system is a repeater rather than an endpoint, there is no retry cutoff because there is no login event from repeaters. Thus, if the target system is a repeater, step 388 proceeds by the "No" branch to step 392 and in step 392 a retry timer thread is launched, bypassing step 390. Likewise, if the target is an endpoint system and the retry cutoff has not expired, step 388 proceeds by the "No" branch.

Figure 3D:
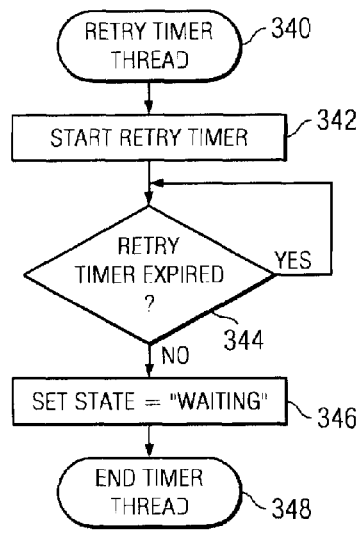
FIG. 3D illustrates, in flowchart form, a retry timer thread, in accordance with an embodiment of the present invention.

Referring now to FIG. 3D, there is illustrated therein retry timer thread 340. In step 342 retry timer is started. In step 344 it is determined if the retry timer has expired. If not, thread 340 loops until the timer expires and then, in step 346, on expiration of the timer the job state is set to "WAITING". In step 348, timer thread 340 ends.

Returning to FIG. 3C, after launching the retry timer thread, in step 392, thread 370 proceeds to step 379. In step 379, it is determined if the job state is "WAITING" or "FAILED." The job state may be set to "WAITING" in step 346, FIG. 3D. If so, then thread 370 notifies thread 300, FIG. 3A, signaling an event whereby thread 300 breaks out of the event loop, step 308, and terminates, step 385. Otherwise, in step 381 thread 370 loops until the endpoint logs in and, in step 383, the job state is set equal to "WAITING," and again notifies thread 300 in step 308.

Returning to FIG. 3A after the job state is set to "WAITING" in step 346, FIG. 3D or in step 383, FIG. 3C, depending on the path followed in step 379, FIG. 3C, step 306 of thread 300 then determines that the distribution that launched error handling thread 370 is ready for scheduling, and then initiates a session to execute the distribution in steps 310-320, as previously described.

Although the present invention and its advantages have been described in detail, it should be understood that various changes, substitutions and alterations can be made herein without departing from the spirit and scope of the invention as defined by the appended claims.

What is claimed is:

1. A connection scheduling method, operable in a node of a networked data processing system comprising a plurality of nodes, comprising the steps of:

determining if a job is available for scheduling;

determining, in response to said step of determining if said job is available, if a session is available, wherein said session is included in a pool of sessions, said pool of sessions having a preselected one of a set of priority levels corresponding to a priority level of said job and wherein said session effects an execution of said job;

creating a network connection to a target system for said execution of said job, wherein said target system is another node of the networked data processing system;

launching said session to effect said execution of said job, if said session is available; and launching an error handling thread in response to an error condition, said error handling thread releasing said session.

2. The method of claim 1 wherein said session comprises a thread.

3. The method of claim 1 further comprising the step of determining if said network connection is an existing network connection, and wherein said step of creating said network connection is performed if said network connection is not an existing network connection, and wherein said session is launched using said existing network connection if said network connection is an existing network connection such that said existing network connection supports multiple logical sessions.

4. The method of claim 1 further comprising the step of changing value of a job state from a first value to a second value in response to said launching of said error handling thread.

5. The method of claim 4 wherein said first value signals that said job is available for scheduling.

6. The method of claim 1 further comprising the step of retrying said steps of determining if a job is available for scheduling, determining if a session is available, and launching said session, in response to an error condition.

7. The method of claim 6 wherein said step of retrying is repeated until a predetermined time interval has elapsed.

8. The method of claim 7 further comprising the step of registering a callback method in response to an expiry of said predetermined time interval.

9. The method of claim 8 wherein said steps of determining if a job is available for scheduling, determining if a session is available, and launching said session are performed in response to an invoking of said callback method by said target system.

* * * * *